United States Patent
Kiraly et al.

(10) Patent No.: US 7,711,167 B2
(45) Date of Patent: May 4, 2010

(54) FISSURE DETECTION METHODS FOR LUNG LOBE SEGMENTATION

(75) Inventors: Atilla Peter Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 820 days.

(21) Appl. No.: 11/566,323

(22) Filed: Dec. 4, 2006

(65) Prior Publication Data

US 2007/0133894 A1 Jun. 14, 2007

Related U.S. Application Data

(60) Provisional application No. 60/742,974, filed on Dec. 7, 2005.

(51) Int. Cl.
*G06K 9/00* (2006.01)
*A61B 5/05* (2006.01)

(52) U.S. Cl. .................. 382/128; 382/154; 600/410

(58) Field of Classification Search ............ 382/100, 382/128, 129, 130, 131, 132, 133, 134, 154, 382/162, 168, 181, 199, 203, 219, 232, 254, 382/260–266, 274, 276, 285, 291, 305, 312; 378/8; 128/207.14; 600/410; 312/100
See application file for complete search history.

(56) References Cited

U.S. PATENT DOCUMENTS

| | | | | |
|---|---|---|---|---|
| 5,881,124 A * | 3/1999 | Giger et al. | ..................... | 378/8 |
| 6,795,521 B2 | 9/2004 | Hsu et al. | | |
| 6,796,621 B2 * | 9/2004 | Choi et al. | .................. | 312/100 |
| 6,898,303 B2 * | 5/2005 | Armato et al. | .............. | 382/131 |
| 7,315,639 B2 * | 1/2008 | Kuhnigk | ..................... | 382/131 |
| 2002/0009215 A1 * | 1/2002 | Armato et al. | .............. | 382/131 |
| 2003/0051733 A1 * | 3/2003 | Kotmel et al. | .......... | 128/207.14 |
| 2003/0055331 A1 * | 3/2003 | Kotmel et al. | ............... | 600/410 |
| 2005/0207630 A1 * | 9/2005 | Chan et al. | .................. | 382/131 |

OTHER PUBLICATIONS

T. Kitasaka, et al., "Detection of Colonic Polyps from 3D Abdominal CT Images by Surface Fitting", CARS, vol. 1281, pp. 1151-1156, 2005.

J.M. Kuhnigk, et al., "Lung Lobe Segmentation by Abatomy-Guided 3D Watershed Transform", SPIE Medical Imaging (3660), 188-198, 1999.

Q. Li, et al., "Selective Enhancement Filters for Nodules, Vessels, and Airway Walls in Two-and Three-Dimensional CT Scans", Med. Phys. 30(8), pp. 2040-2051, Aug. 2003.

O. Monga, et al., "Using Partial Derivatives of 3D Images to Extract Typical Surface Features", Soumis a Computer Vision Graphics and Image Processing, 1992.

(Continued)

*Primary Examiner*—Seyed Azarian (57) ABSTRACT

A fissure detection method for lung lobe segmentation in 3D image data is disclosed. In this method, 3D lung image data is filtered using one or more filters based on at least one of planar structures coupled with vessel suppression, curvature computations, and local gradient magnitude and direction comparisons. Fissures are detected in the 3D lung image data based on the filtered 3D lung image data, and lung lobes are segmented from the 3D lung image data based on the detected fissures.

27 Claims, 4 Drawing Sheets

OTHER PUBLICATIONS

J. Wang, et al., "Segmentation of Pulmonary Fissures on Diagnostic CT", International Conference on Diagnostic Imaging and Analysis, ICDIA '02, Shanghai, 2002.

T. Ohkawa, et al., "Tubular Tissue-Based Segmentation of Lung Lobes from Chest MDCT Images", IEEE Computer Engineering Division, pp. 126-127, (2000).

S. Ukil, et al., "Auto, Lung Lobe Seg. in X-Ray CT Images by 3D Watershed Transform Using Anatomic Info. from the Segment Airway Tree", SPIE Med. Imag, vol. 5747, SPIE 2005.

R. Wiemker, et al., "Unsupervised Extraction of the Pulmonary Interlobar Fissures from High Resolution Thoracic CT Data", CARS 2005, pp. 1121-1126.

L. Zhang, et al., "Detection of Lung Lobar Fissures Using Fuzzy Logic", SPIE Medical Imaging (3660), 188-198, 1999.

* cited by examiner

FISSURE DETECTION METHODS FOR LUNG LOBE SEGMENTATION

This application claims the benefit of U.S. Provisional Application No. 60/742,974 filed Dec. 7, 2005, the disclosure of which is herein incorporated by reference.

BACKGROUND OF THE INVENTION

The present invention relates to detecting fissures for lung lobe segmentation in medical imaging data, such as computed tomography (CT) image data.

The lungs are divided into five lobes, which operate as separate functional units. The lung lobes are divided by thin walls called fissures. Problems within the lungs are often confined to a particular lobe. Thus, in order to determine in which lobe a problem is located, it is important to be able to detect lobar fissures in medical imaging data, such as computed tomography (CT) and magnetic resonance imaging (MRI) data. Lobar fissures can be difficult to detect in CT and MRI data. One reason for this difficulty is that the fissures defining the boundaries of the lobes are very thin and can be obscured by noise, artifacts, and partial volume effects. Furthermore, various lung diseases can erode or affect lung fissures such that they are even harder to detect.

BRIEF SUMMARY OF THE INVENTION

The present invention is directed to fissure detection methods for lung lobe segmentation in 3D image data. The present invention provides filter-based approaches for emphasizing fissures within medical images of the lungs. This emphasized information can then be used within existing frameworks to aid in lung lobe segmentation. These filtering approaches work by assigning higher values to regions of the image that are more likely to correspond to lung fissures. The present invention provides various filtering methods and processes for emphasizing fissures, which are plane-like structures in 3D lung image data. The filtering methods make use of first and second order derivatives of the 3D lung image data to emphasize flat structures such as fissures. Once the fissures are emphasized by this filtering, existing lung lobe segmentation techniques can be performed with this added information.

According to an embodiment of the present invention, a 3D lung image data is filtered using at least one of a filter based on both planar structures and vessel suppression, a filter based on curvature computations, and a filter based on local gradient magnitude and direction comparisons. The 3D lung image data can represent segmented lung images from a received 3D image dataset. The 3D image data can be various types of medical imaging data including CT data, MRI data, etc. Each of the filters can be used to filter the 3D lung image data, or any combination of these filters can be used. These filters calculate a score for each voxel of the 3D lung image data in response to a measurement of a plane-like characteristic of the 3D image data at the voxel. The filters can also include component filters for suppressing the score given higher responses for at least one of vesselness, airwayness, and gray level of the 3D image data at the voxel. Once the 3D lung image data is filtered, the fissures are identified in the 3D lung image data based on the filtered 3D lung image data. Lung lobe segmentation may then be performed based on the detected fissures.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a filter-based method for defining the lobes of the lungs by emphasizing fissures within 3-dimensional (3D) image data. The filters described herein make use of first and second order derivatives of the 3D image data to emphasize flat structures in the medical imaging data such as the lung fissures. As used herein the term 3D image data refers any type of 3-dimensional imaging modalities, including but not limited to Computed Tomography (CT), Magnetic Resonance Imaging (MRI), Positron Emission Tomography (PET), Single Photon Emission Computed Tomography (SPECT), 3D ultrasound (US), etc. Once the fissures are emphasized within the image data, it is possible to segment the lung lobes.

Figure 1:
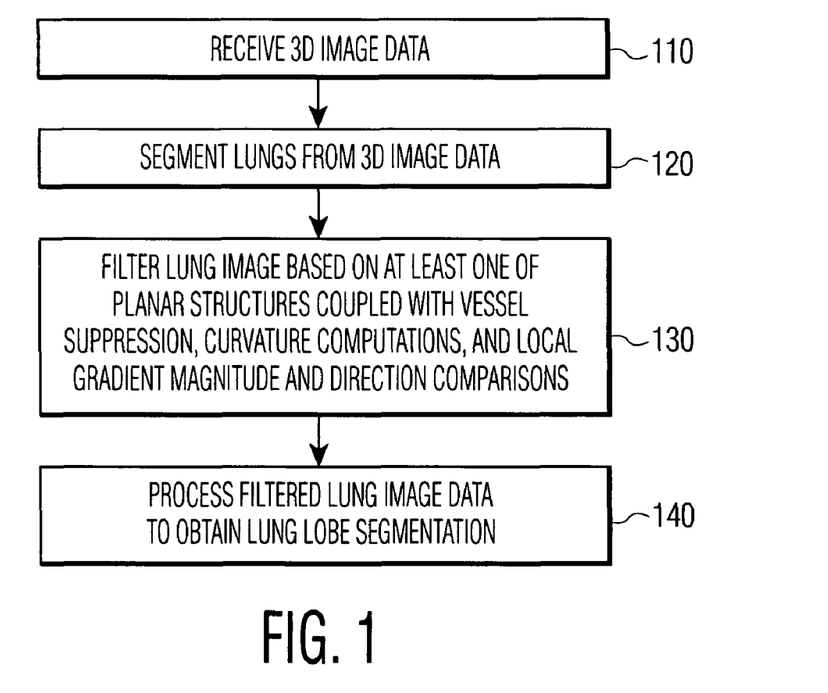
FIG. 1 illustrates a method of lung lobe segmentation.

FIG. 1 illustrates a method of lung lobe segmentation. As illustrated in FIG. 1, at step 110, 3D image data is received. As described above, the 3D image data can be CT data, MRI data, etc. The 3D image data can be received directly from a medical image scanner, such as a CT scanner, or can be previously stored 3D image data retrieved from a memory.

At step 120, the lungs are segmented from the 3D image data. The complete lungs can be segmented using a known lung segmentation technique in order to constrain the lung lobe segmentation to a portion of the 3D image data representing the lungs. The portion of the 3D image data representing the lungs is used as a starting point for the remaining operations of the lung lobe segmentation process. This allows for a more accurate segmentation of the lung lobes by preventing portions of the image data outside of the lungs from being included with the lung lobe segmentation. Furthermore, this speeds up the lung lobe segmentation process since only the portion of the 3D image data representing the lungs is processed. The portion of the 3D image data representing the segmented lungs is referred to herein as the lung image data.

At step 130, the lung image data is filtered based on at least one of planar structures coupled with vessel suppression, curvature computations, and local gradient magnitude and direction comparisons. The lung image data is filtered using at least one filter, which computes a probability value, or a "score", for each voxel corresponding to the likelihood that the voxel represents part of a lung fissure. In some cases, a filter emphasizing plane-like structures in the lung image data can produce false positives which may be eliminated based upon size and density. Accordingly, the filters include components to detect plane-like shapes and suppress regions based upon gray level. Since vessels are not commonly found near fissures, it is also possible to include an additional suppression component based upon a high vessel response.

Various conventional methods for lobe segmentation based on fissure emphasis via filtering have recently been proposed. Structure tensor based filters used for fissure emphasis have been proposed in "Detection of Lung Lobar Fissures Using Fuzzy Logic," L. Zhang and J. M. Reinhardt, SPIE Medical Imaging (3660), 188-198, 1999 and in "unsupervised Extraction of the Pulmonary Interlobar Fissures from High Resolution Thoracic CT Data," R. Wiemker, T. Bulow, and T. Blaffert, CARS 2005, 1121-1126. Such a filter is based on repeated first order derivative computations to detect plane like structures. Wiemker et. al also proposed the use of a Hessian matrix based filter to emphasize plane-like structures. This filter makes use of the Hessian matrix computed from second order derivatives about the image. The sign and magnitude of the eigenvalues of the matrix are then used to in a formula to determine the final value for each voxel. Wiemker et at use the following equation to compute the value for each voxel:

$$P = \frac{|\lambda_0| - |\lambda_1|}{|\lambda_0| + |\lambda_1|}$$

where $\lambda_0$ and $\lambda_1$ are the two largest magnitude eigenvalues of the Hessian matrix. However, this filter provides a high response for plane-like structures without any suppression of non-plane like structures. Hence, this existing method can potentially create false positives in regions of the parenchyma.

In the present invention, a Hessian matrix based method that incorporates vessel suppression can be used for filtering the lung image data. Hence, the suppression of tubular structures will improve the filter by reducing false positives since vessel-like structures do not typically occur in the same region as the lung fissures. The following equation can be used to detect plane like structures with vessel suppression:

$$P = |\lambda_1| - |\lambda_2|$$

where $\lambda_2$ is the smallest magnitude eigenvalue. This filter can also be coupled with gray-level suppression, can lead to fewer false positive regions.

In addition, let V be a filter based on the "vesselness" of a structure, describing its similarity to a vessel or elongated shape. Then the inverse of this measure can be applied for the final plane measure, such that regions with high vesselness can be eliminated from consideration. The same possibility exists for a filter describing "airwayness" to help identify locations that are possible airways. Such filters can be combined with the previously mentioned filter to further reduce false positives.

The use of the vesselness or airwayness measures for fissure detection are effective since these filters, which make use of second derivatives, are prone to noise within the image. Such noisy areas often occur around more prominent structures, such as the vessels or visible airways, which do not typically occur in the same region as the lung fissures.

Figure 2:
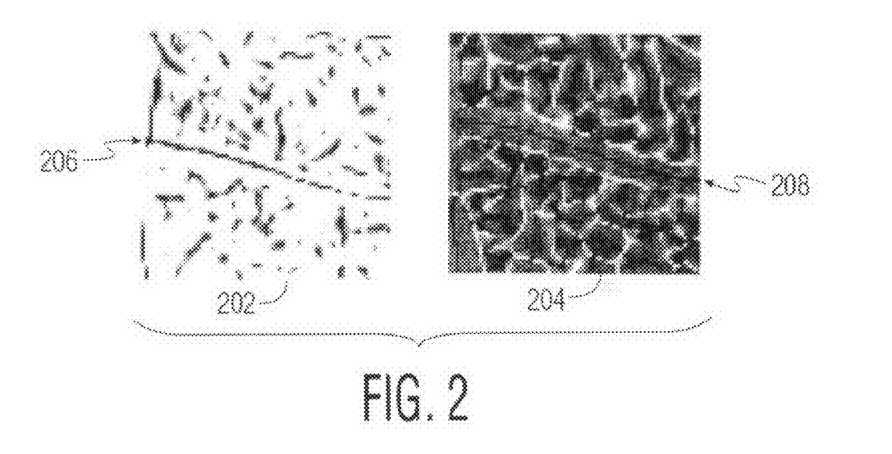
FIG. 2 illustrates results of curvature calculations applied to an exemplary image.

Another possible filter for filtering the lung image data is a curvature based filter. Since fissures are unlikely to have high curvature values, a curvature-based filter should produce a low response in comparison to other regions. As known in the art, the curvature of an image at a particular voxel can be computed directly from the image data through an implicit surface. It is also possible to obtain curvature values using surface fitting. The curvature values of the lung image data at each voxel can be used to detect the lung fissures since the fissures do not have large curvature values. Accordingly, a formula based on the curvature values can be applied to emphasize large curvature values. Implicit surface filters operate by computing multiple second and first order derivatives of the image to produce curvature values such as a Gaussian or principal curvature. FIG. 2 illustrates results of curvature calculations applied to an exemplary image. Image 202 shows the results of mean curvature calculations applied to an axial image slice, and image 204 shows the results of Gaussian curvature calculations applied to an axial image slice. In both of these cases, the curvature calculations were done directly on the image data without explicit definition of surfaces. A single scale was used in calculating the curvature values. Images 202 and 204 show the magnitude of the calculated curvature values. Since fissures 206 and 208 in images 202 and 204 are rather flat, they demonstrate very low curvature and appear to be darker than other regions of the lung. Although dark regions appear outside of the fissures 206 and 208, they can be eliminated based upon their size or shape, via hysteresis thresholding. As described above, components for grey-level compression and/or vesselness suppression can be added to the curvature based filter to improve the performance thereof.

Another possible filter for emphasizing lobar fissures involves using the gradient magnitude and relative directions. This filter calculates a score for each voxel of the lung image data based upon the gradient magnitude and angle at the voxel. For example, the filter can use the following equation to compute a likelihood score:

$$P(x) = \sum_{\forall y \in |x-y|y<r} w(y) \times \cos(x, y),$$

where x is the location (voxel) of the computation, y is a neighboring voxel from the set of all voxels within a radius r of x. w(y) is a weight associated with location y determined by the magnitude of the gradient. cos(x,y) is the cosine of the angle between the gradient directions at location x and y. The result is a sum that gives higher values to locations where prominent gradients point in the same direction. This value can also be scaled by the number of neighboring voxels considered, to allow the value to lie between 1 and 0. Gray-level based suppression can be performed during or after the computation to help eliminate voxels that are clearly not fissures due to their intensity.

Another possible method for emphasizing lobar fissures within lung image data is a region-growing based approach that takes into account the gradient magnitude and direction in addition to the gray-levels. Region growing starts with one or more seed points and continues growing a structure into neighboring regions based upon properties of the image. A common region-growing procedure considers only the gray-level properties of neighboring voxels. According to this embodiment of the present invention, the gradient magnitude is used to decide if the growing continues. In addition, the gradient direction of the current location determines progression as well. By computing the angle of the gradient within nearby voxels, only those with voxels with angles close to zero with respect to the current voxel become part of the region-growing.

This process can also be used for a fuzzy segmentation of the lung fissures. In this second possibility, the angle of the gradients determines the probability. Hence, larger angles produce reduced intensities, to result in an output of varying gray-level. It is also possible to introduce curvature and other filters to influence the expansion of the region growing. A fast-marching or level-set approach can also be used with the speed terms being influenced by these same parameters. With these approaches, the front of the marching or level-set can also be constrained to a required flatness or wall-ness measure. These methods operate by minimizing energy according to internal constraints and external, i.e. image-derived constraints. The computations described above would apply to the external constraints while a flatness requirement would apply to the internal energy constraints.

Four exemplary filtering methods for filtering the lung image data are described above. Any or all of the above described filters may be combined with each other or other filters to improve the performance thereof. For example, each of the above described filters may be combined by normalized averaging of the filter results from each filter. Some of the filters presented here may be more robust to noise, while others may have better sensitivity. In this case, the advantages of two or more filters can be combined to provide a better response. In addition, scalar terms such as the curvature can be combined with vector terms such as gradient information for post-processing the filter output. The used of an airwayness or vesselness filter can also be used with any of these filters to eliminate or reduce sections of the image from being considered a fissure. These measures can also be used to identify the sections of the image that are internal portions of a particular lobe.

Figure 3:
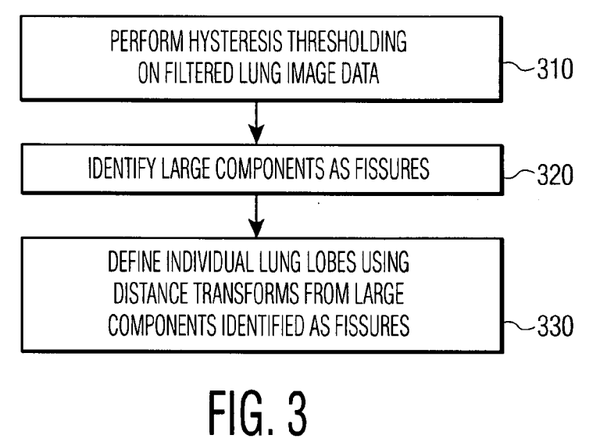
FIG. 3 illustrates an exemplary lung lobe segmentation method using filtered lung image data.

Returning to FIG. 1, at step 140, the filtered lung image data is processed to segment the lung lobes from the filtered lung image data. The lung lobes are segmented from the lung image data based on the filtered image data. Step 140 is shown in greater detail in FIG. 3. FIG. 3 illustrates an exemplary lung lobe segmentation method using the filtered lung image data according to an embodiment of the present invention.

At step 310, hysteresis thresholding is performed on the filtered lung image data in order to identify voxels which are candidates to be fissures. Hysteresis thresholding selects as candidates voxels having the maximum scores in local regions of the filtered lung image data. Multiple thresholds are used throughout the filtered lung image data, and each voxel is compared to the threshold in the neighborhood of the voxel. If the score, or probability value, of a voxel is greater than the local threshold, the voxel is marked as a candidate. Accordingly, voxels having maximal scores with respect to neighboring voxels are marked as fissure candidates.

At step 320, large components of fissure candidates are identified as fissures. This eliminates smaller candidates generated due to image noise.

At step 330, the individual lobes are defined using distance transforms from the large components identified as fissures. The entire filtered lung image is marked based on distance from the large components. A distance transform is then used to define a cost function. This cost function can then be used to segment the lung lobes. For example, the cost function can be used in a region growing segmentation method to assign costs to different voxels in the lung image data. The cost function can assign lower costs to voxels further from the fissures, and higher costs to voxels closer to the fissures. This allows seed points to grow faster at distances further from the fissures.

Figure 4:
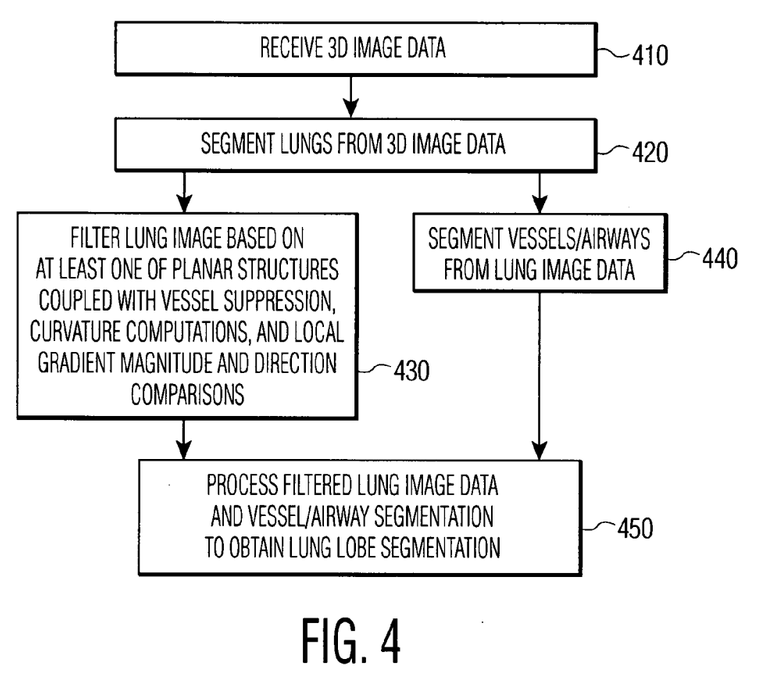
FIG. 4 illustrates a method of lung lobe segmentation according to an embodiment of the present invention.

FIG. 4 illustrates a method of lung lobe segmentation according to another embodiment of the present invention. As illustrated in FIG. 4, at step 410, 3D image data is received. At step 420, the lungs are segmented from the 3D image data resulting lung image data. After the lung image data is segmented from the received 3D image data, steps 430 and 440 are performed. As shown in FIG. 4, steps 430 and 440 can be performed simultaneously.

At step 430, the lung image data is filtered based on at least one of planar structures coupled with vessel suppression, curvature computations, and local gradient magnitude and direction comparisons. As described above, various filters can be implemented according to embodiments of the present invention to perform this step. At step 440, vessels and/or airways are segmented from the lung image data. Airway and vessel segmentation can be performed using standard segmentation methods such as region growing, thresholding, filtering, etc. Vessels and airways are not typically located in the vicinity of fissures. Thus, when locations of the vessels and/or airways are detected, the vessel/airway locations can be ruled out as possible fissure locations.

At step 450, the filtered lung image data and the segmented vessels and/or airways are processed to segment the lung lobes from the filtered lung image data. This can be performed by the method described in FIG. 3. However, this method can be adjusted to take into account the segmented vessels and/or airways. For example, the hysteresis thresholding may not be performed in regions where the vessels and/or airways are located. It is also possible that the hysteresis thresholding is performed over the entire lung image data, but candidates located in regions where the vessels and/or the airways are located are discarded.

Figure 5:
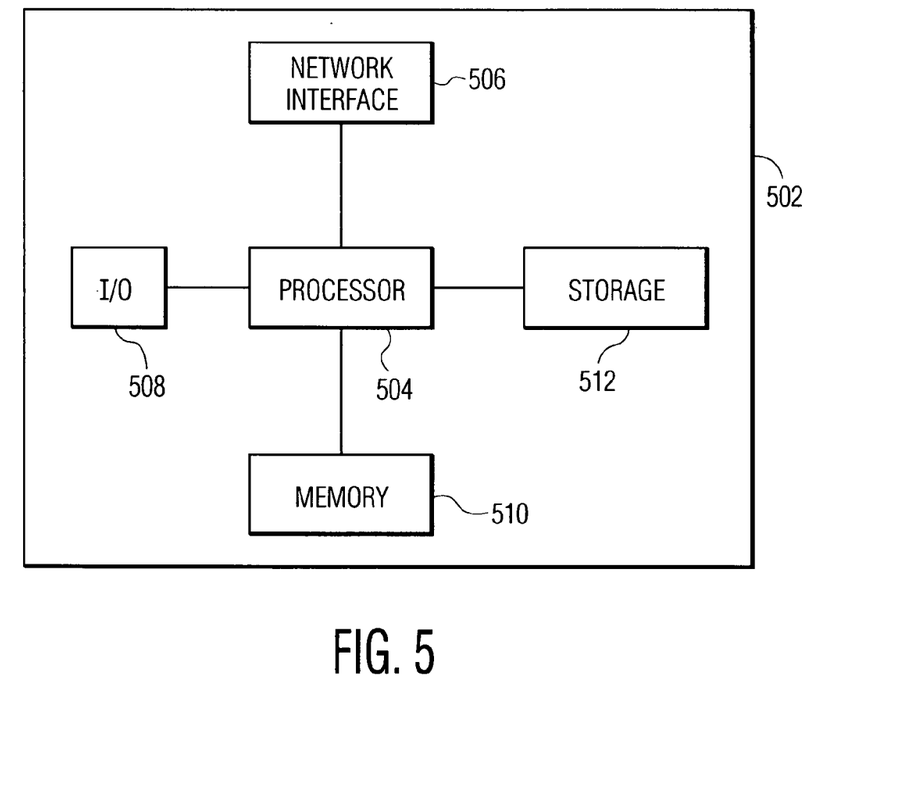
FIG. 5 illustrates a high level block diagram of a computer capable of implementing the present invention.

The above described methods for lung lobe segmentation can be implemented on a computer using well known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512 (e.g., magnetic disk) and loaded into memory 510 when execution of the computer program instructions is desired. Thus, the above described filters for filtering lung image data can be defined by the computer program instructions stored in the memory 510 and/or storage 512 and controlled by the processor 504 executing the computer program instructions. The computer 502 also includes one or more network interfaces 506 for communicating with other devices via a network. The computer 502 also includes input/output 508 which represents devices which allow for user interaction with the computer 502 (e.g., display, keyboard, mouse, speakers, buttons, etc.) One skilled in the art will recognize that an implementation of an actual computer will contain other components as well, and that FIG. 5 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
 filtering 3D lung image data, the 3D lung image data comprising a plurality of voxels and using at least one of a filter based on both planar structures and vessel suppression,
a filter based on curvature computations, and a filter based on local gradient magnitude and direction comparisons;

for each voxel of said plurality of voxels, calculating a score representing the likelihood of the voxel being a fissure using said at least one of a filter based on both planar structures and vessel suppression, a filter based on curvature computations,
and a filter based on local gradient magnitude and direction comparisons; and
identifying lobar fissures in the 3D lung image data based on the filtered 3D lung image data resulting from said filtering step.

2. The method of claim 1, wherein said step of identifying lobar fissures comprises:
performing region growing based on the filtered 3D lung image data resulting from said filtering step.

3. The method of claim 1, wherein said step of identifying lobar fissures comprises:
executing a level-set operation based on the filtered 3D lung image data resulting from said filtering step.

4. The method of claim 1, wherein said step of filtering 3D lung image data comprises:
filtering said 3D lung image data using vessel suppressing plane filter based on a Hessian matrix.

5. The method of claim 1, further comprising:
segmenting lung lobes from the 3D lung image data based on the identified lobar fissures.

6. The method of claim 5, further comprising:
receiving 3D image data; and
segmenting the 3D lung image data from the received 3D image data.

7. The method of claim 1, wherein said step of filtering 3D lung image data comprises:
filtering the 3D lung image data using two or more of a filter based on both planar structures and vessel suppression, a filter based on curvature computations, and a filter based on local gradient magnitude and direction comparisons.

8. The method of claim 1, wherein said step of identifying fissures in the 3D lung image data comprises:
performing hysteresis thresholding on the filtered 3D lung image data to determine fissure candidate voxels; and
identifying large groups of candidate voxels as fissures.

9. The method of claim 1, further comprising:
segmenting at least one of vessels and airways from the 3D lung image data.

10. The method of claim 9, wherein said step of detecting fissures in the 3D lung image data based on the filtered 3D lung image data comprises:
detecting fissures at locations in the 3D lung image data where said at least one of vessels and airways are not located.

11. An apparatus comprising:
means for filtering 3D lung image data, the 3D lung image data comprising a plurality of voxels and using at least one of a filter based on both planar structures and vessel suppression, a filter based on curvature computations, and a filter based on local gradient magnitude and direction comparisons;
mean for calculating a score for each voxel of said plurality of voxels, the score representing the likelihood of the voxel being a fissure using said at least one of a filter based on both planar structures and vessel suppression, a filter based on curvature computations, and a filter based on local gradient magnitude and direction comparisons;
and means for identifying lobar fissures in the 3D lung image data based on the filtered 3D lung image data.

12. The apparatus of claim 11, wherein said means for identifying lobar fissures comprises:
means for performing region growing based on the filtered 3D lung image data.

13. The apparatus of claim 11, wherein said means for identifying lobar fissures comprises:
means for executing a level-set operation based on the filtered 3D lung image data.

14. The apparatus of claim 11, wherein said filter based on both planar structures and vessel suppression filters the 3D lung image data using a Hessian matrix.

15. The apparatus of claim 11, further comprising:
means for segmenting lung lobes from the 3D lung image data based on the identified lobar fissures.

16. The apparatus of claim 11, wherein said means for filtering 3D lung image data comprises:
means for filtering the 3D lung image data using two or more of a filter based on both planar structures and vessel suppression, a filter based on curvature computations, and a filter based on local gradient magnitude and direction comparisons.

17. The apparatus of claim 11, wherein said means for identifying fissures in the 3D lung image data comprises:
means for performing hysteresis thresholding on the filtered 3D lung image data to determine fissure candidate voxels; and
means for identifying large groups of candidate voxels as fissures.

18. The apparatus of claim 11, further comprising:
means for segmenting at least one of vessels and airways from the 3D lung image data.

19. A computer readable medium storing computer program instructions, said computer program instructions defining the steps comprising:
filtering 3D lung image data, the 3D lung image data comprising a plurality of voxels, based on at least one of planar structures coupled with vessel suppression, curvature computations, and local gradient magnitude and direction comparisons;
for each voxel of said plurality of voxels, calculating a score representing the likelihood of the voxel being a fissure using said at least one of a filter based on both planar structures and vessel suppression, a filter based on curvature computations, and a filter based on local gradient magnitude and direction comparisons; and
identifying lobar fissures in the 3D lung image data based on the filtered 3D lung image data resulting from said filtering step.

20. The computer readable medium of claim 19, wherein the computer program instructions defining the step of identifying lobar fissures comprise computer program instructions defining the step of:
performing region growing based on the filtered 3D lung image data resulting from said filtering step.

21. The computer readable medium of claim 19, wherein the computer program instructions defining the step of identifying lobar fissures comprise computer program instructions defining the step of:
executing a level-set operation based on the filtered 3D lung image data resulting from said filtering step.

22. The computer readable medium of claim 21, wherein the computer program instructions defining the step of filtering 3D lung image data comprise computer program instructions defining the step of:
filtering 3D lung image data based on planar structures coupled with vessel suppression using a Hessian matrix.

23. The computer readable medium of claim 19, further comprising computer program instructions defining the step of:

segmenting lung lobes from the 3D lung image data based on the identified lobar fissures.

24. The computer readable medium of claim 19, wherein the computer program instructions defining the step of filtering 3D lung image data comprise computer program instructions defining the step of:

filtering the 3D lung image data based on two or more of planar structures coupled with vessel suppression, curvature computations, and local gradient magnitude and direction comparisons.

25. The computer readable medium of claim 19, wherein the computer program instructions defining the step of identifying fissures in the 3D lung image data comprise computer program instructions defining the steps of:

performing hysteresis thresholding on the filtered 3D lung image data to determine fissure candidate voxels; and     identifying large groups of candidate voxels as fissures.

26. The computer readable medium of claim 19, further comprising computer program instructions defining the step of:

segmenting at least one of vessels and airways from the 3D lung image data.

27. The computer readable medium of claim 26, wherein the computer program instructions defining the step of detecting fissures in the 3D lung image data based on the filtered 3D lung image data comprise computer program instructions defining the step of:

detecting fissures at locations in the 3D lung image data where said at least one of vessels and airways are not located.

* * * * *